United States Patent
Zeng et al.

(10) Patent No.: US 11,405,488 B2
(45) Date of Patent: Aug. 2, 2022

(54) METHOD, APPARATUS AND SYSTEM FOR PROCESSING ACCESS REQUEST OF ENTERPRISE BRANCH, AND EQUIPMENT AND MEDIUM

(71) Applicant: GUIZHOU BAISHANCLOUD TECHNOLOGY CO., LTD., Guiyang (CN)

(72) Inventors: Dongfang Zeng, Guiyang (CN); Hui Miao, Guiyang (CN)

(73) Assignee: GUIZHOU BAISHANCLOUD TECHNOLOGY CO., LTD., Guiyang (CN)

( * ) Notice: Subject to any disclaimer, the term of this patent is extended or adjusted under 35 U.S.C. 154(b) by 0 days.

(21) Appl. No.: 17/280,091

(22) PCT Filed: Sep. 26, 2019

(86) PCT No.: PCT/CN2019/108116
§ 371 (c)(1),
(2) Date: Mar. 25, 2021

(87) PCT Pub. No.: WO2020/063734
PCT Pub. Date: Apr. 2, 2020

(65) Prior Publication Data
US 2022/0046109 A1  Feb. 10, 2022

(30) Foreign Application Priority Data
Sep. 28, 2018 (CN) .......................... 201811140683.5

(51) Int. Cl.
*H04L 67/63* (2022.01)

(52) U.S. Cl.
CPC .................... *H04L 67/63* (2022.05)

(58) Field of Classification Search
CPC ..... H04L 67/2814; H04L 63/18; H04L 67/16; H04L 67/10; H04L 63/10; H04L 63/02;
(Continued)

(56) References Cited

U.S. PATENT DOCUMENTS 9,087,189 B1 * 7/2015 Koeten ............... H04L 63/20
9,167,050 B2 * 10/2015 Durazzo ............. H04L 67/60
(Continued)

FOREIGN PATENT DOCUMENTS

| CN | 106533883 A | 3/2017 |
|----|-------------|--------|
| CN | 208656813 U | 3/2019 |
| WO | 2014067776 A1 | 5/2014 |

OTHER PUBLICATIONS

Min Yan et al., "R&D Practice of Self-service Platform Portal for Small and Medium-sized Enterprises," Telecommunications Science, pp. 164-171, Dec. 20, 2017.
(Continued)

*Primary Examiner* — David R Lazaro
(74) *Attorney, Agent, or Firm* — Anova Law Group, PLLC

(57) ABSTRACT

An access request processing method includes Customer Premise Equipment (CPE) in an enterprise branch network receiving an access request in the enterprise branch network, determining whether the access request is for accessing an extranet and requires accelerated processing, forwarding the access request to an acceleration network in response to determining that the access request is for accessing the extranet and requires accelerated processing, receiving response data of the access request from the acceleration network, and sending the response data to a sender of the access request.

17 Claims, 2 Drawing Sheets

(58) Field of Classification Search
CPC ......... H04L 41/08; H04L 67/28; H04L 45/30;
H04L 45/04; H04L 45/22; H04L 45/302;
H04L 45/306; H04L 49/25; H04L 45/74
See application file for complete search history.

(56) References Cited

U.S. PATENT DOCUMENTS

| | | | |
|---|---|---|---|
| 10,616,180 B2* | 4/2020 | Chanak | H04L 63/029 |
| 10,938,925 B1* | 3/2021 | Fitzhugh | H04L 67/52 |
| 2016/0050125 A1 | 2/2016 | Mattson et al. | |
| 2016/0261564 A1* | 9/2016 | Foxhoven | H04L 63/0272 |
| 2017/0310594 A1* | 10/2017 | Kotha | H04L 47/50 |
| 2018/0109485 A1 | 4/2018 | Lai et al. | |
| 2019/0182351 A1* | 6/2019 | Chen | H04L 67/1029 |
| 2020/0045054 A1* | 2/2020 | Yang | H04L 41/24 |
| 2021/0044585 A1* | 2/2021 | Kahol | H04L 63/10 |
| 2021/0266319 A1* | 8/2021 | Olshansky | H04W 12/06 |
| 2021/0344608 A1* | 11/2021 | Zeng | H04L 61/4511 |
| 2021/0352568 A1* | 11/2021 | Zeng | H04W 48/02 |
| 2022/0046109 A1* | 2/2022 | Zeng | H04L 63/0471 |
| 2022/0109588 A1* | 4/2022 | Zeng | H04L 12/4641 |

OTHER PUBLICATIONS

World Intellectual Property Organization (WIPO) International Search Report for PCT/CN2019/108116 dated Jan. 2, 2020 5 Pages.
Intellectual Property India The Examination Report for Application No. 202127012474 dated Feb. 15, 2022 5 pages.

* cited by examiner

METHOD, APPARATUS AND SYSTEM FOR PROCESSING ACCESS REQUEST OF ENTERPRISE BRANCH, AND EQUIPMENT AND MEDIUM

CROSS-REFERENCE TO RELATED APPLICATIONS

The present application is a national stage entry under 35 U.S.C. § 371 of International Application No. PCT/CN2019/108116, filed Sep. 26, 2019, which claims priority to Chinese Patent Application No. 201811140683.5, filed to the CNIPA on Sep. 28, 2018, titled "Method, Device and System for Processing an Access Request of Enterprise Branch," the entire contents of both of which are incorporated herein by reference.

TECHNICAL FIELD

The present application relates to, but is not limited to, the field of Internet technologies, and in particular to a method, an apparatus, a system for processing an access request of an enterprise branch, and equipment and medium.

BACKGROUND

Conventional large enterprises usually set up their subsidiaries or branches in different regions, and such branches as local sales departments and local production bases are usually large in scale and mainly undertake regional localization functions. Under the organizational leadership of the headquarters, the branches adopt the same management policy and take concerted marketing actions, and organically integrate unified management and decentralized operation, so as to realize the union of scale economies effect through standardized operation. A common national chain of large shopping mall enterprises is described below as an example.

Shopping malls are large in scale, with more than 100 staff members and a dedicated IT department responsible for the management and operation of their network. The core services required for the operation of shopping malls include systems such as transaction systems, warehouse management systems and security monitoring systems which are generally deployed in a computer room of the shopping mall. Shopping malls have the need to access the services of the headquarters, while the headquarters also have the need to access a service system of each shopping mall branch thereof. The transactions and warehousing data are the core data of enterprises, so the enterprises often won't directly permit intranets of shopping malls thereof to access any public network, to prevent security problems and leakage risks. Shopping malls all over the world communicate with headquarters thereof by deploying Multiprotocol Label Switch (MPLS) private lines, which facilitates mutual access between the headquarters and the shopping malls with stable, safe and controlled access quality. In addition, the intranets of shopping malls are required to access the network of headquarters for accessing the public network for easy supervision. Considering that the lines of shopping mall branches and headquarters may fail, it is common to deploy two different operator lines for backup, which will add an additional cost.

In the context of cloud services provided by enterprises in the Internet cloud era, enterprise branches will have more and more traffic to access external cloud services, such as public cloud backup and SaaS services.

Conventional large enterprises usually have two kinds of network expansion schemes for branches thereof.

First scheme is to expand operators' private lines. This scheme mainly suffers from slow and costly expansion deployment, and has high requirements for MPLS private lines, which require continuous and massive expansion, but the expansion of private lines is very difficult and costly.

Second scheme is to grant branches the capabilities to access the extranet, and allow cloud services and SaaS services be accessed through local broadband Internet. This scheme may effectively alleviate the problems of slow and costly expansion of private lines. However, it will come with great security risks and uncontrolled traffic in extranet access. Moreover, direct access to cloud services and SaaS services from everywhere in the country makes access quality unstable.

In summary, in the era of Internet cloud, conventional large-scale enterprises are faced with a large increase in the demand for branches thereof to access cloud services and SaaS services on extranets, and the current private line scheme is complex and costly, resulting in the problem of ineffective and unstable operation. Therefore, it is needed to provide a new scheme to reduce the access cost and guarantee the experience effect of the enterprise branch accessing the cloud business and SaaS services of the extranet through its network.

SUMMARY

In order to overcome the problems in related technologies, the present application provides a method, a device and a system for processing an access request of an enterprise branch.

According to a first aspect of the present application, a method for processing an access request from an enterprise branch is provided, including following steps of:

providing a Customer Premise Equipment CPE in an enterprise branch network, and importing the access request in the enterprise branch network into the CPE;

the CPE determining whether the access request is an access request used for accessing an extranet and requiring accelerated processing, and when the access request is an access request used for accessing an extranet and requiring accelerated processing, forwarding the access request to an acceleration network; and the CPE receiving response data of the access request from the acceleration network, and sending the response data to a sender of the access request.

Wherein, the CPE determining whether the access request is an access request used for accessing an intranet, when the access request is an access request used for accessing an intranet, determining a forwarding path according to a diversion rule, and forwarding the access request according to the forwarding path, wherein the forwarding path used is to forward the access request through a private network or through the acceleration network.

Wherein, the CPE receiving the diversion rule from a central controller of the acceleration network.

Wherein, when the forwarding path is used to forward the access request through the acceleration network, an access point in the acceleration network receives the access request and forwards the access request based on dynamic routing until the access request is sent to the CPE that is in a destination subnet of the access request.

Wherein, importing the access request in the enterprise branch network into the CPE comprises: an egress router of the enterprise branch network forwarding the access request conforming to a preset rule to the CPE.

Wherein, the CPE forwarding the access request to an acceleration network comprises: the CPE encrypting the access request and sending the encrypted access request to a network access point nearest to a home location of the enterprise branch network in the acceleration network.

Wherein, the CPE encrypting and transmitting the access request and the response data according to a preset encryption rule.

According to the second aspect of the present application, an apparatus for processing an access request of an enterprise branch, the apparatus is applied to Customer Premise Equipment CPE provided in an enterprise branch network, comprising:

an import module configured to import the access request in the enterprise branch network;

a determining module configured to determine whether the access request is an access request used for accessing an extranet and requiring accelerated processing;

a first forwarding module configured to forward the access request to an acceleration network when the access request is an access request used for accessing an extranet and requiring accelerated processing;

a receiving module configured to receive response data of the access request from the acceleration network; and a response module configured to send the response data to a sender of the access request.

Wherein, the apparatus further comprising a path determining module and a second forwarding module, wherein, the path determining module is configured to determine a forwarding path according to a diversion rule when the access request is an access request used for accessing an intranet;

the forwarding path is used to forward the access request through a private network or through the acceleration network; and the second forwarding module is configured to forward the access request according to the forwarding path.

Wherein, the apparatus further includes an encryption module and a decryption module;

the encryption module is configured to encrypt the access request used for accessing the extranet according to a preset encryption rule; and the decryption module is configured to decrypt the received response data according to the preset encryption rule.

According to a third aspect of the present application, a system for processing an access request of an enterprise branch, comprising: an enterprise branch network and an acceleration network, wherein the enterprise branch network comprises Customer Premise Equipment CPE;

the CPE is configured to receive the access request in the enterprise branch network; determine whether the access request is an access request used for accessing an extranet and requiring accelerated processing, when the access request is an access request used for accessing an extranet, forward the access request to an acceleration network; and receive response data of the access request from the acceleration network, and send the response data to a sender of the access request.

Wherein, the acceleration network further includes a central controller;

the central controller is configured to determine the diversion rule and send the diversion rule to the CPE.

According to a fourth aspect of the present application, a computer device is further provided, including a memory, a processor, and a computer program which is stored in the memory and may be operated in the processor. The steps of the above method are implemented when the computer program is executed by the processor.

According to a fifth aspect of the present application, a computer-readable storage medium in which a computer program is stored is further provided. The steps of the above method are implemented when the program is executed by a processor.

The present application has the following advantages.

1. It may ensure the requirements of smooth access to cloud services by the branch, enterprise data security, rapid deployment and cost control at the same time.

2. With the present application, the enterprise branch may access to services of its headquarters, cloud business and SaaS services through its network, the deployment cost is significantly lower than that of a private line, and the complexity of operation is also significantly reduced, so that the access cost is reduced and the experience effect of the enterprise branch accessing the cloud business and SaaS services of the extranet through its network can be guaranteed.

3. It takes the lead to introduce into the SD-WAN network as the backup of the private line of the enterprise, which effectively solves the problem of high cost of the double private lines of the enterprise. Enterprises may adopt one private line and one SD-WAN line, which may effectively reduce the cost.

4. It takes the lead to introduce into the SD-WAN network as the backup of the private line of the enterprise to solve the problems of insufficient line capacity and slow and expensive expansion, and to accelerate SaaS services and cloud service access.

5. The CPE is introduced into the system as access equipment to perform diversion according to the rules set by users or according to the rules configured in real time or in advance by the central controller of the acceleration network, which may allow effective diversion management and facilitate the group's unified management on the traffic of branches.

6. The private data forwarded within the acceleration network are encrypted and thus cannot be intercepted.

BRIEF DESCRIPTION OF THE DRAWINGS

The accompanying drawings, which constitute a part of the present application, are included to provide a further understanding of the present application. The exemplary embodiments of the present application and description thereof herein are only for explaining the present application, but not for unduly limiting the present application. In Figures.

DETAILED DESCRIPTION OF THE EMBODIMENTS

The technical schemes in the embodiments of the present application will be clearly and completely described as below with reference to the accompanying drawings in the embodiments of the present application. Obviously, the described embodiments are a part of, not all of, the embodiments of the present application. All other embodiments obtained by those of ordinary skill in the art based on the embodiments of the present application without paying any creative effort shall fall into the protection scope of the present application. It should be noted that the embodiments of the present application and the features in the embodiments can be arbitrarily combined with each other in the case of no conflict.

Embodiment 1

Figure 1:
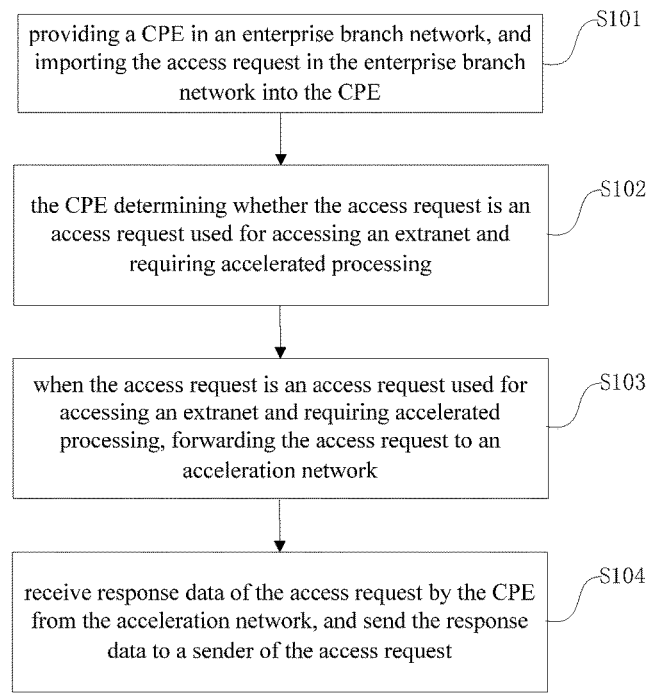
FIG. 1 is a flowchart of a method for processing an access request of an enterprise branch according to an exemplary embodiment.

As shown in FIG. 1, a method for processing an access request of an enterprise branch is provided, including following steps.

In a step 101, Customer Premise Equipment (CPE) is provided in the enterprise branch network, and the access request in the enterprise branch network is imported into the CPE.

In a step 102, the CPE determines whether the access request is an access request used for accessing an extranet and requiring accelerated processing.

In a step 103, the access request is forwarded to an acceleration network when it is an access request used for accessing an extranet and requiring accelerated processing.

In a step 104, the CPE receives response data of the access request from the acceleration network and sends the response data to a sender of the access request.

In the step 101, after the CPE is provided in the enterprise branch network, the CPE has an IP address belonging to the enterprise branch network, and thus may connect with the acceleration network and a private network. Importing the access request in the enterprise branch network into the CPE include a step of an egress router of the enterprise branch network forwarding the request conforming to a preset rule to the CPE.

The access request may be an upload request, a download request, a TCP (such as http/https) request, a UDP request, etc.

The step 102 further includes the following steps. The CPE determines whether the access request is an access request used for accessing an intranet, and if so, analyzes the data protocol, source, destination address and protocol of the access request, searches for a preset diversion rule (the diversion rule is configured by a client to determine whether the request is forwarded through the private network or through the acceleration network according to the configuration parameters such as application type, source IP and destination IP of the access request, and the diversion rule may also include a rule of automatically switching to another path after one path is fully loaded, or a diversion rule determined according to a distribution ratio of different paths), determines a forwarding path according to the diversion rule, and forwards the access request according to the forwarding path. The forwarding path is to forward the request through a private network or through the acceleration network. A network management program, through which the user-configured diversion rules may be received, is installed in the CPE, so that the traffic of the private network and the acceleration network may be managed in real time. The access request for accessing the intranet may be an access request for accessing the network of the enterprise's headquarters, or an access request for accessing the networks of other branches of the enterprise.

The CPE determines whether the access request is an access request used for accessing the intranet according to the destination address of the access request and determines that the access request is an access request used for accessing the intranet when the destination address belongs to the intranet.

The CPE determines whether the access request is an access request requiring accelerated processing and used for accessing the extranet according to the destination address of the access request and the presence of an identifier requiring to be processed in an accelerated manner in the access request, and determines that the access request is an access request requiring accelerated processing and used for accessing the extranet when the destination address of the access request belongs to the intranet and the access request carries the identifier requiring to be processed in an accelerated manner.

The method further includes: the CPE sends the access request directly to the extranet when the access request is an access request used for accessing the extranet and not requiring accelerated processing.

When the forwarding path is used to forward the request through the acceleration network, an access point in the acceleration network receives the access request and forwards the access request based on dynamic routing until the access request is sent to the CPE that is in a destination subnet of the access request.

The method further includes the following steps.

When the forwarding path is used to forward the request through the private network, the CPE sends the access request to the private network, and the private network sends the access request to the CPE of the destination enterprise branch network.

The enterprise branch network refers to the network of the headquarters or subsidiary of the enterprise. The extranet may be a cloud service network or a SaaS service network. The acceleration network is a Software-Defined Wide Area Network (SD-WAN), which includes a plurality of network access points, i.e., Point-of-Presence (PoP). The SD-WAN is a private network of massive resources across the globe, which is accessed through PoP and dynamically routed internally to select an optimal back-to-origin server path. In a typical application scenario, an access PoP point nearest to (e.g., in the same city as) the address of the enterprise branch network and a back-to-origin server PoP nearest to (e.g., in the same city as) the address of a origin server may be found through the SD-WAN. Through NAT, the intranet access is switched to the extranet access to send a request to the destination address, and then a response from the destination address is switched to the intranet, so that the extranet data required by the users may be obtained very quickly. After receiving the access request forwarded by the CPE, the network access point in the acceleration network forwards the access request based on dynamic routing and finds the next forwarding access point until the request is sent to the access point nearest to the destination address. The access point sends the access request to the destination address of the extranet, receives response data, forwards the access request based on dynamic routing to the network access point nearest to the home location of the enterprise branch network, and through the network access point the access request is send to the CPE in the intranet.

The acceleration network also includes a central controller, which is connected with each access point in the acceleration network and with the CPE in each enterprise branch network. For example, when the acceleration network is an SD-WAN network, the central controller is an SD-WAN controller. The central controller determines the diversion rule for the CPE in each enterprise branch network and sends the determined diversion rule to the CPE in each enterprise branch network. In addition to determining the diversion rule, the central controller may also determine the traffic priority, traffic limiting policing, etc. The central controller may provide a real-time ingress to show the traffic situation of each branch and the bandwidth utilization of each user, which is conducive to management.

In order to improve the security of data transmission, the access request and the response data may be encrypted before transmitted.

Specifically, the process of encrypting the access request includes following steps. The CPE encrypts the access request used for accessing the extranet and requiring accelerated processing according to a preset encryption rule, and sends the encrypted access request to the network access point nearest to the home location of the enterprise branch network in the acceleration network. The network access point in the acceleration network forwards the encrypted access request to the network access point nearest to the home location of the destination extranet of the access request, and the nearest network access point decrypts the encrypted access request and sends the decrypted access request to the destination extranet of the access request.

The process of encrypting the response data includes: after receiving the response data, the network access point nearest to the home location of the destination extranet of the access request encrypts the response data according to the preset encryption rule. The network access point in the acceleration network forwards the encrypted response data to the network access point nearest to the home location of the enterprise branch network, the nearest network access point sends the encrypted response data to the CPE in the enterprise branch network, and the CPE decrypts the encrypted response data.

Figure 2:
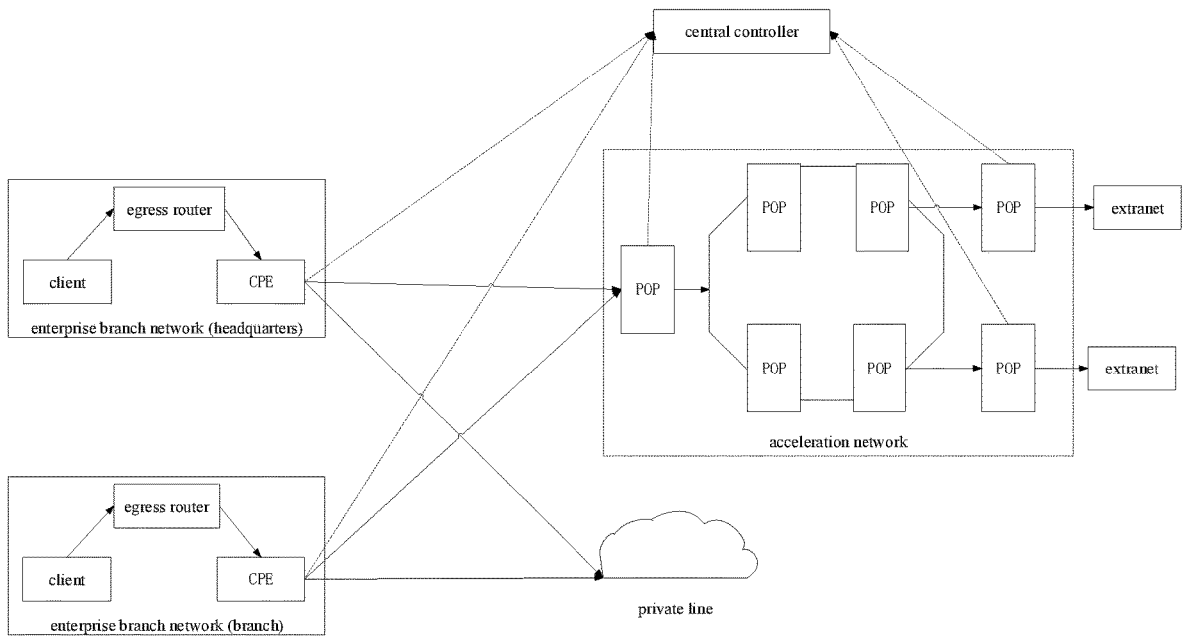
FIG. 2 is a structural diagram of a system for processing an access request of an enterprise branch according to an exemplary embodiment.

As shown in FIG. 2, a system for processing an access request of an enterprise branch is provided, including an enterprise branch network and an acceleration network. The enterprise branch network includes Customer Premise Equipment (CPE).

The CPE is configured to receive the access request in the enterprise branch network; determine whether the access request is an access request used for accessing the extranet and requiring accelerated processing, and if so, forward the access request to an acceleration network; and receive response data of the access request from the acceleration network, and send the response data to a sender of the access request.

The acceleration network includes a network access point having an encryption module and a decryption module. The encryption module is configured to encrypt the response data according to a preset encryption rule when the network access point is the network access point nearest to a home location of the extranet and receives the response data from the extranet. The decryption module is configured to decrypt the encrypted access request according to the preset encryption rule when the network access point is the network access point nearest to the home location of the extranet and receives the encrypted access request.

The acceleration network further includes a central controller which is configured to determine the diversion rule and send the diversion rule to the CPE.

Figure 3:
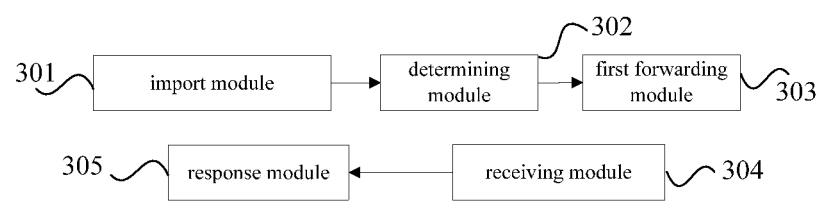
FIG. 3 is a block diagram of an apparatus for processing an access request of an enterprise branch according to an exemplary embodiment.

As shown in FIG. 3, an apparatus for processing an access request of an enterprise branch, which is applied to Customer Premise Equipment (CPE), is provided, including an import module 301, a determining module 302, a first forwarding module 303, a receiving module 304 and a response module 305.

The import module 301 is configured to import the access request in an enterprise branch network.

The determining module 302 is configured to determine whether the access request is an access request used for accessing the extranet and requiring accelerated processing or an access request used for accessing the intranet and requiring accelerated processing.

The first forwarding module 303 is configured to forward the access request to an acceleration network when the access request is an access request used for accessing the extranet and requiring accelerated processing.

The receiving module 304 is configured to receive response data of the access request from the acceleration network.

The response module 305 is configured to send the response data to a sender of the access request.

The apparatus for processing the access request of the enterprise branch further includes a path determination module and a second forwarding module.

The path determination module is configured to determine a forwarding path according to a diversion rule when the access request is an access request used for accessing an intranet. The forwarding path is used to forward the access request through a private network or through the acceleration network.

The second forwarding module is configured to forward the access request according to the forwarding path.

The apparatus for processing the access request of the enterprise branch further includes an encryption module and a decryption module. The encryption module is configured to encrypt the access request for accessing the extranet according to a preset encryption rule, and the decryption module is configured to decrypt the received response data according to the preset encryption rule.

The steps of the method according to the embodiment of the present application may be rearranged, merged and deleted according to actual needs.

The modules used in the method for processing the access request of the enterprise branch according to the embodiment of the present application may be merged, divided and deleted according to actual needs.

According to the embodiment of the present application, a computer-readable storage medium in which a computer program is stored is further provided. The steps of the above method are implemented when the program is executed by a processor.

According to the embodiment of the present application, a computer device is further provided, including a memory, a processor, and a computer program which is stored in the memory and may be operated in the processor. The steps of the above method are implemented when the computer program is executed by the processor.

Figure 4:
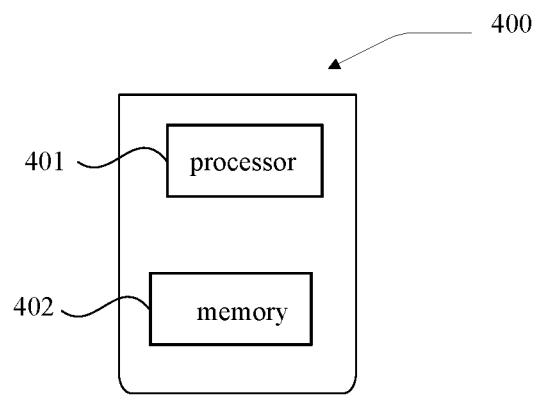
FIG. 4 is a block diagram of a device configured to implement the method processing the access request of the enterprise branch according to an exemplary embodiment.

FIG. 4 is a block diagram of a device 400 configured to implement the method for processing the access request of the enterprise branch according to an exemplary embodiment. For example, the device 400 may be provided as a server. Referring to FIG. 4, the device 400 includes a processor 401, and there may be one or more processors as required. The device 400 also includes a memory 402 configured to store instructions, such as application programs, executable by a processor 401. There may be one or more memories as required, and there may be one or more application programs stored therein. The processor 401 is configured to execute the instructions to perform the above method.

It should be understood by those of skill in the art that embodiments of the present application may be provided as methods, apparatuses (equipment), or computer program products. Therefore, the present application may take the form of an entirely hardware embodiment, an entirely software embodiment, or an embodiment containing both hardware and software elements. Furthermore, the present application may take the form of a computer program product implemented on one or more computer usable storage media containing computer usable program codes therein. The computer storage medium includes volatile and nonvolatile, removable and non-removable media implemented in any method or technology for storing information (such as computer readable instructions, data structures, program modules or other data), including but not limited to RAM, ROM, EEPROM, flash memory or other memory technologies, CD-ROM, digital versatile disk (DVD) or other optical disk storage, magnetic cartridges, magnetic tapes, disk storage or other magnetic storage devices, or any other media that may be adopted to store desired information and may be accessed by a computer. Furthermore, it is well known to those of ordinary skilled in the art that communication media typically contain computer-readable instructions, data structures, program modules, or other data in modulated data signals such as carrier waves or other transmission mechanisms, and may include any information delivery media.

The present application is described with reference to flowcharts and/or block diagrams of the method, apparatus (equipment) and computer program product according to embodiments of the present application. It should be understood that each process and/or block in the flowchart and/or block diagram, and combinations of processes and/or blocks in the flowchart and/or block diagram may be implemented by computer program instructions. These computer program instructions may be provided to a processor of a general-purpose computer, a special-purpose computer, an embedded processor or other programmable data processing devices to produce a machine, such that the instructions executed by the processor of the computer or other programmable data processing devices produce a means for implementing the functions specified in one or more processes of the flowchart and/or one or more blocks of the block diagram.

These computer program instructions may also be stored in a computer-readable memory capable of directing a computer or other programmable data processing devices to operate in a specific manner, such that the instructions stored in the computer-readable memory produce an article of manufacture containing an instruction means that implements the functions specified in one or more processes of the flowchart and/or one or more blocks of the block diagram.

These computer program instructions may also be loaded onto a computer or other programmable data processing devices, such that a series of operational steps are performed on the computer or other programmable devices to produce a computer-implemented process, and the instructions executed on the computer or other programmable devices provide steps for implementing the functions specified in one or more processes of the flowchart and/or one or more blocks of the block diagram.

As used herein, the terms "including," "includes" or any other variation thereof are intended to cover non-exclusive inclusion, so that an article or device including a series of elements includes not only those elements, but also other elements not explicitly listed, or elements inherent to such an article or device. Without further limitation, the elements defined by the statement "including . . . " or "includes . . . " do not preclude the existence of additional identical elements in the article or device including the elements.

Although preferred embodiments of the present application have been described, those of skilled in the art may make additional alterations and modifications to these embodiments once they know the basic inventive concepts. Therefore, the appended claims are intended to be interpreted as including the preferred embodiments and all alterations and modifications that fall within the scope of the present application.

Obviously, those of skilled in the art may make various modifications and variations to the present application without departing from the spirit and scope of the present application. In this way, if these modifications and variations of the present application fall within the scope of the claims of the present application and their equivalent technologies, the intent of the present application encompasses these modifications and variations as well.

INDUSTRIAL APPLICABILITY

With the present application, the enterprise branch can take into account the experience of an enterprise branch network accessing a cloud business and SaaS services, and the deployment cost is significantly lower than that of a private line, and the complexity of operation is also significantly reduced, so that the access cost is reduced and the experience effect of the enterprise branch network accessing the cloud business and the SaaS services of the extranet can be guaranteed.

The invention claimed is:

1. An access request processing method comprising:
    receiving, by Customer Premise Equipment (CPE) in an enterprise branch network, an access request in the enterprise branch network;
    determining, by the CPE, whether the access request is for accessing an extranet and requires accelerated processing;
    in response to determining that the access request is for accessing the extranet and requires accelerated processing, forwarding, by the CPE, the access request to an acceleration network;
    receiving, by the CPE, response data of the access request from the acceleration network; and
    sending, by the CPE, the response data to a sender of the access request.

2. The method according to claim 1, further comprising:
    determining whether the access request is for accessing an intranet;
    in response to determining that the access request is for accessing the intranet, determining a forwarding path according to a diversion rule, the forwarding path being to forward the access request through a private network or through the acceleration network; and
    forwarding the access request according to the forwarding path.

3. The method according to claim 2, further comprising:
    receiving the diversion rule from a central controller of the acceleration network.

4. The method according to claim 2, wherein:
    the forwarding path is to forward the access request through the acceleration network; and
    forwarding the access request according to the forwarding path includes forwarding the access request to an access point in the acceleration network for further forwarding based on dynamic routing until the access request is sent to other CPE in a destination subnet of the access request.

5. The method according to claim 1, wherein receiving the access request in the enterprise branch network includes receiving the access request sent by an egress router of the enterprise branch network conforming to a preset rule.

6. The method according to claim 1, wherein forwarding the access request to the acceleration network includes:
   encrypting the access request to obtain an encrypted access request; and
   sending the encrypted access request to a network access point nearest to a home location of the enterprise branch network in the acceleration network.

7. The method according to claim 1, further comprising:
   encrypting and transmitting the access request and the response data according to a preset encryption rule.

8. A computer-readable storage medium storing a computer program that, when executed by a processor, causes the processor to perform the method according to claim 1.

9. An access request processing device comprising:
   a processor; and
   a memory storing a computer program that, when executed by the processor, causes the processor to:
      receive an access request in an enterprise branch network;
      determine whether the access request is for accessing an extranet and requires accelerated processing;
      in response to determine that the access request is for accessing the extranet and requires accelerated processing, forward the access request to an acceleration network;
      receive response data of the access request from the acceleration network; and
      send the response data to a sender of the access request.

10. The device according to claim 9, wherein the computer program further causes the processor to:
    determine whether the access request is for accessing an intranet;
    in response to determining that the access request is for accessing the intranet, determine a forwarding path according to a diversion rule, the forwarding path being to forward the access request through a private network or through the acceleration network; and
    forward the access request according to the forwarding path.

11. The device according to claim 10, wherein the computer program further causes the processor to receive the diversion rule from a central controller of the acceleration network.

12. The device according to claim 10, wherein:
    the forwarding path is to forward the access request through the acceleration network; and
    the computer program further causes the processor to forward the access request to an access point in the acceleration network for further forwarding based on dynamic routing until the access request is sent to Customer Premise Equipment (CPE) in a destination subnet of the access request.

13. The device according to claim 9, wherein the computer program further causes the processor to receive the access request sent by an egress router of the enterprise branch network conforming to a preset rule.

14. The device according to claim 9, wherein the computer program further causes the processor to:
    encrypt the access request to obtain an encrypted access request; and
    send the encrypted access request to a network access point nearest to a home location of the enterprise branch network in the acceleration network.

15. The device according to claim 9, wherein the computer program further causes the processor to:
    encrypt the access request used for accessing the extranet according to a preset encryption rule; and
    decrypt the response data according to the preset encryption rule.

16. An access request processing system comprising:
    an acceleration network; and
    an enterprise branch network including Customer Premise Equipment (CPE) configured to:
       receive an access request in the enterprise branch network;
       determine whether the access request is for accessing an extranet and requires accelerated processing;
       in response to determining that the access request is for accessing the extranet, forward the access request to the acceleration network;
       receive response data of the access request from the acceleration network; and
       send the response data to a sender of the access request.

17. The system according to claim 16, wherein the acceleration network includes a central controller configured to determine a diversion rule and send the diversion rule to the CPE.

* * * * *